United States Patent
Ferrari et al.

(10) Patent No.: US 12,503,023 B2
(45) Date of Patent: Dec. 23, 2025

(54) SEAT TRIM TENSIONER

(71) Applicant: LEAR CORPORATION, Southfield, MI (US)

(72) Inventors: Michael Ferrari, St. Clair Shores, MI (US); Michael Kint Alope, Cebu (PH); Ramil Dominic Reyes, Lapu-lapu (PH); Fernando Reyes, Cebu (PH)

(73) Assignee: LEAR CORPORATION, Southfield, MI (US)

( * ) Notice: Subject to any disclaimer, the term of this patent is extended or adjusted under 35 U.S.C. 154(b) by 245 days.

(21) Appl. No.: 18/215,347

(22) Filed: Jun. 28, 2023

(65) Prior Publication Data

US 2025/0001919 A1    Jan. 2, 2025

(51) Int. Cl.
| | |
|---|---|
| *B60N 2/58* | (2006.01) |
| *B60N 2/02* | (2006.01) |
| *B60J 1/20* | (2006.01) |
| *B60R 7/04* | (2006.01) |
| *E06B 9/40* | (2006.01) |

(52) U.S. Cl.
CPC ......... *B60N 2/5816* (2013.01); *B60N 2/0284* (2013.01); *B60J 1/2061* (2013.01); *B60R 7/043* (2013.01); *E06B 9/40* (2013.01)

(58) Field of Classification Search
CPC ... E06B 9/40; E06B 9/50; B60R 22/34; B60R 7/043; B60J 1/2061; B60J 1/2058; B60J 1/2016; B60J 1/205; B60J 7/085; B60N 2/58–609
See application file for complete search history.

(56) References Cited

U.S. PATENT DOCUMENTS

| | | | | |
|---|---|---|---|---|
| 1,599,769 | A * | 9/1926 | Jaynes | B60R 22/34 |
| | | | | 242/379 |
| 6,382,720 | B1* | 5/2002 | Franklin | B60N 2/6027 |
| | | | | 297/229 |
| 8,070,219 | B2* | 12/2011 | Walters | A47C 7/5068 |
| | | | | 297/423.26 |
| 10,449,878 | B2* | 10/2019 | Sala | B60N 2/0224 |
| 10,569,672 | B1 | 2/2020 | Kooker et al. | |
| 11,208,017 | B2 | 12/2021 | Buljan et al. | |
| 2016/0082921 | A1* | 3/2016 | Sun | B60R 22/1855 |
| | | | | 242/419.9 |

FOREIGN PATENT DOCUMENTS

DE     102010039027     2/2012

* cited by examiner

*Primary Examiner* — Syed A Islam
(74) *Attorney, Agent, or Firm* — Brooks Kushman P.C.

(57) ABSTRACT

A vehicle seat includes a seat frame supporting a base cushion and an extendable cushion that moves relative to the base cushion. Textile material encloses the cushion assembly and includes a bridging segment that spans a space between the base cushion and the extendable cushion. A tensioner includes a roller that receives the segment of textile material wrapped around the roller. The roller rotates on a shaft relative to the seat frame about an axis of rotation. A return spring is connected to the roller and the shaft to exert a tensioning force on the segment of textile material. The return spring biases the segment of textile material to be rolled around the roller when retracting. The return spring resists extending and holds the segment of textile material in tension when the segment of textile material is extended.

20 Claims, 4 Drawing Sheets

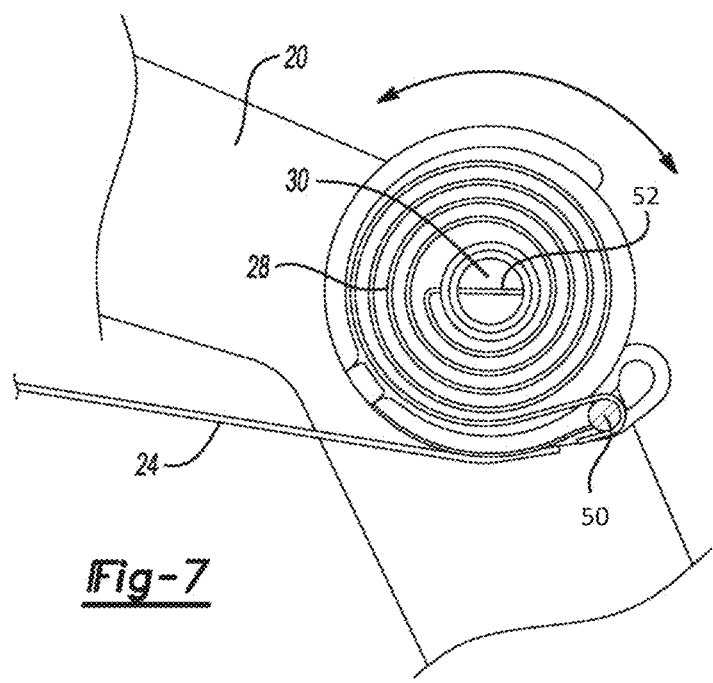
_Fig-7_
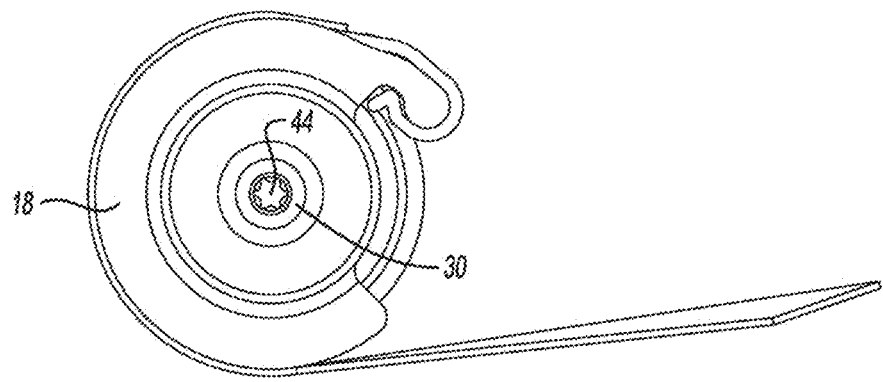
_Fig-8_

SEAT TRIM TENSIONER

TECHNICAL FIELD

This disclosure relates to a tensioner for trim material when a seat cushion trim is extended and retracted.

BRIEF DESCRIPTION OF THE DRAWINGS

FIG. 7 is a side elevation view of the first side of the roller and the bracket with the segment of textile material partially unwrapped from the roller in an extended position.

FIG. 8 is a side elevation view of a second side of the roller that includes a bolt with the segment of textile material in the unextended position.

DETAILED DESCRIPTION

Figure 1:
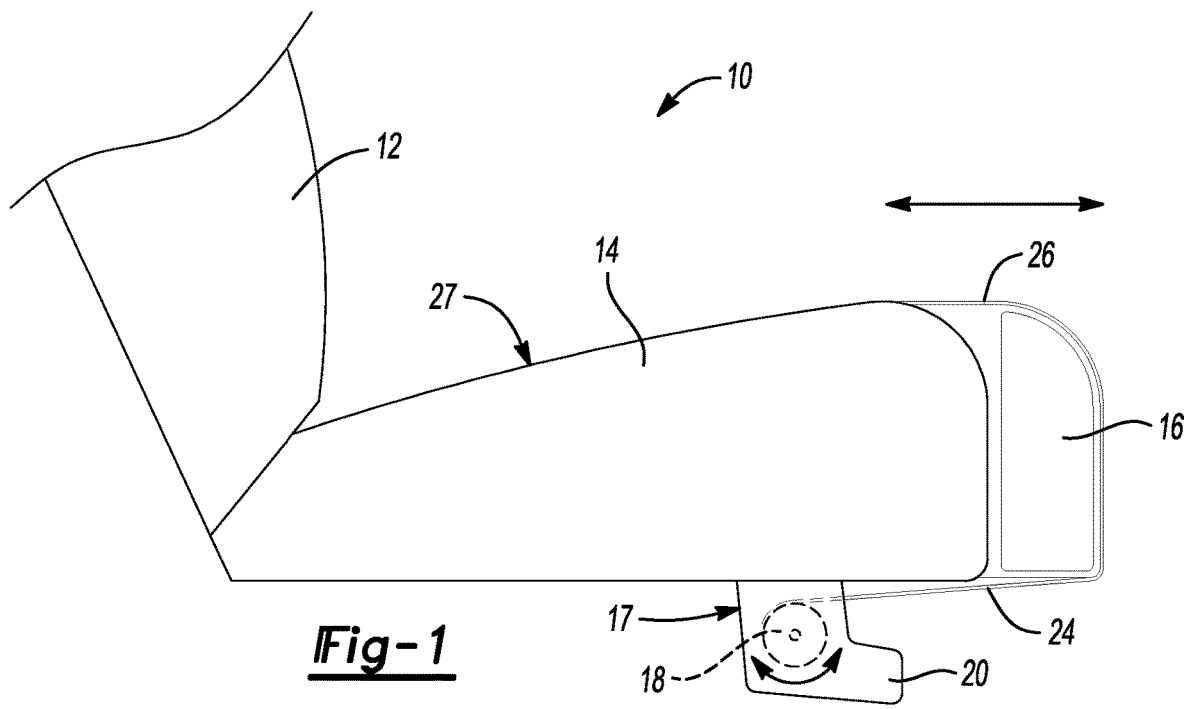
FIG. 1 is a fragmentary schematic side elevation with the view of a vehicle seat equipped with a cover length extender.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Referring to FIG. 1, a vehicle seat 10 is schematically illustrated. The vehicle seat 10 includes a seat back 12 and a base cushion 14 and an extendable cushion 16. A tensioner assembly generally indicated by reference numeral 17 includes a roller 18 and a bracket 20 that are attached to the seat frame 22, shown in FIG. 2. The term "roller" and 2, as used herein refers to a rotatable support that can be provided in various shapes and configurations and can be made from various materials, such as plastic, metal, or a combination thereof.

Figure 2:
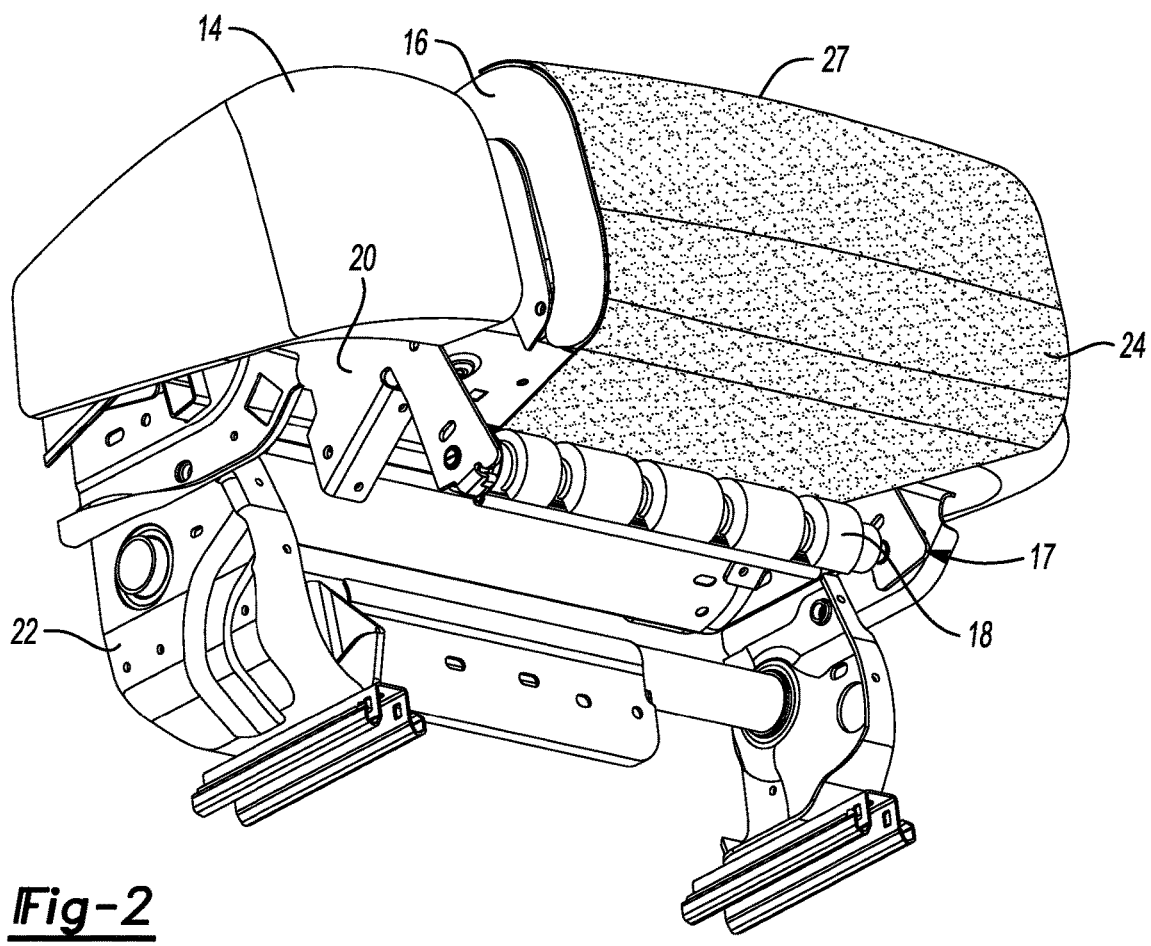
FIG. 2 is a fragmentary bottom/side perspective view of a vehicle seat and cover length extender.

Referring to FIGS. 1 and 2, a segment of textile material 24 extends from the roller 18 and around the front of the extendable cushion 16. The term "front" as used herein refers to the front of a vehicle that the seat is assembled. The segment of textile material 24 as used herein refers to cloth, vinyl, leather, or similar materials that are suitable for use as a vehicle seat cover. A bridging portion 26 of the segment of textile material 24 spans the space between the base cushion 14 and the extendable cushion 16 and forms part of the seating surface 27. The roller 18 pivots as indicated by the arcuate arrow in FIG. 1 to extend and retract the segment of textile material 24 as will be described in greater detail below.

Referring to FIG. 2, the base cushion 14 and the extendable cushion 16 are shown with the tensioner 17 disposed below the seating surface 27. The tensioner 17 is attached to the seat frame 22 and the segment of textile material 20 is shown to be routed around the front of the extendable cushion 16 to the seating surface 27.

Figure 3:
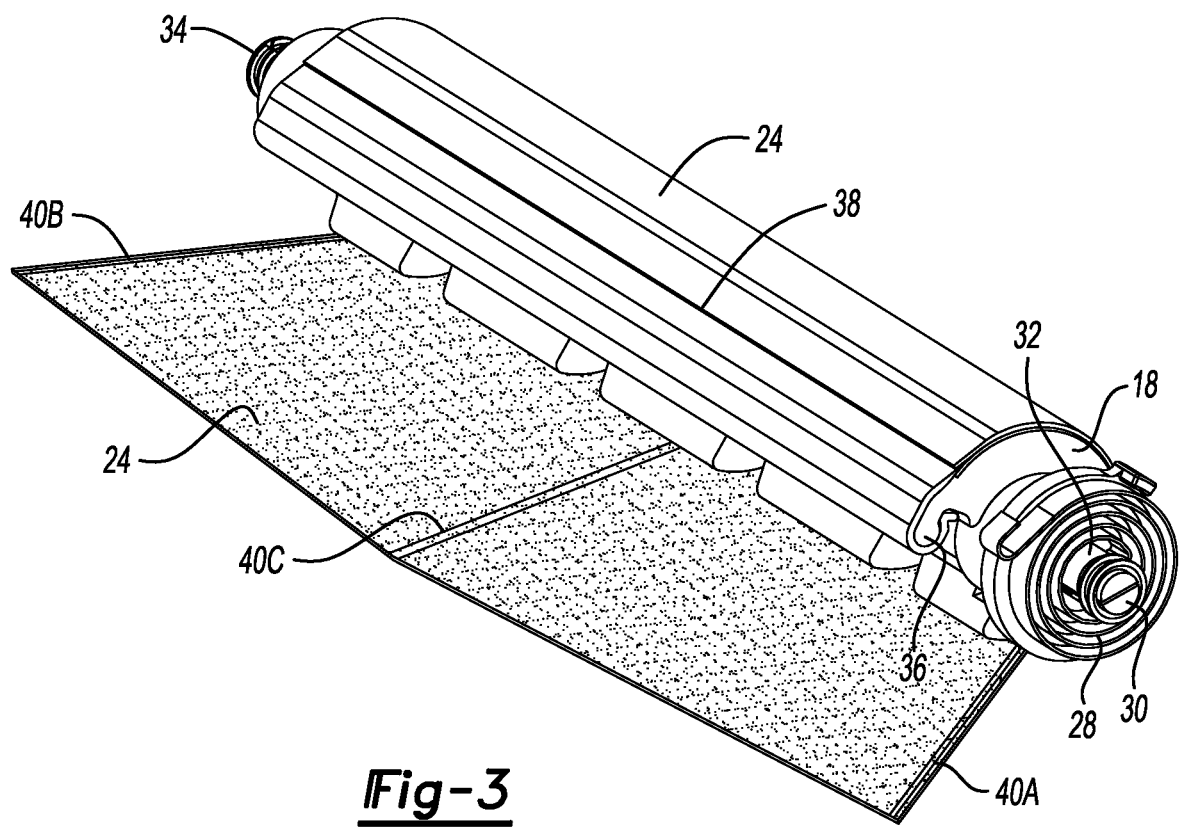
FIG. 3 is a perspective view of a roller with a segment of textile material and a return spring.
Figure 4:
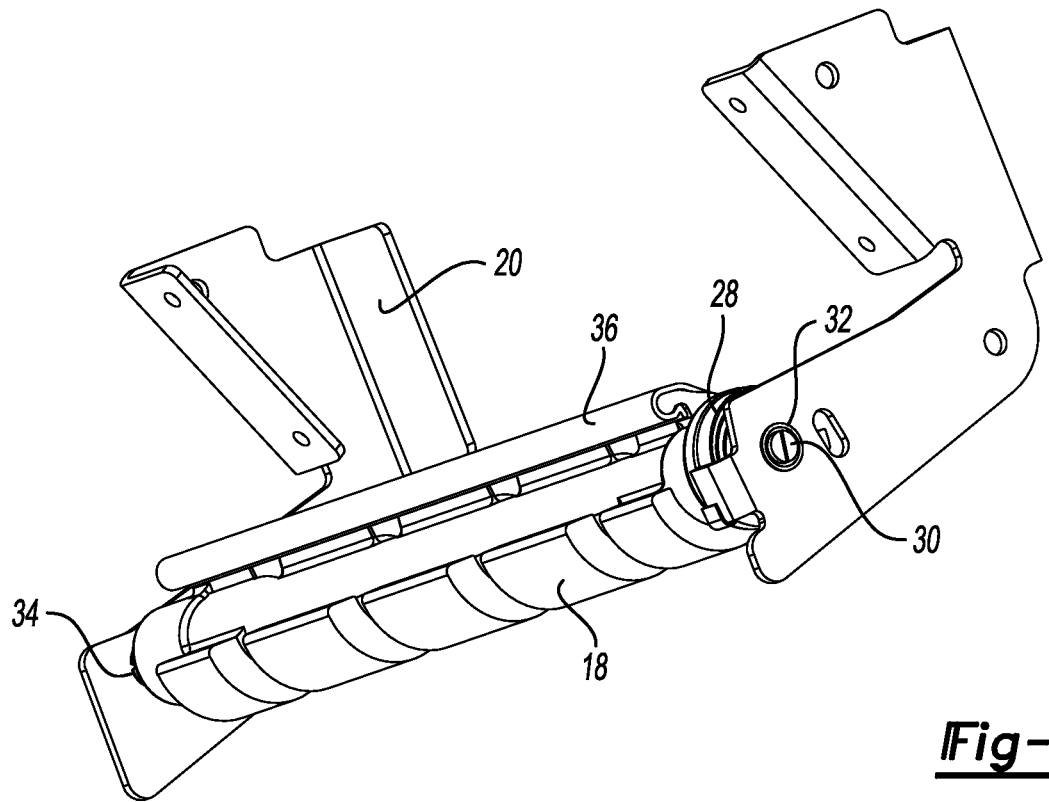
FIG. 4 is a perspective view of the roller, a hook for the segment of textile material, and a bracket.

Referring to FIGS. 3 and 4, the roller 18 is shown with the segment of textile material 24 wrapped around the roller 18 and attached to the roller 18 by a hook 36. As illustrated, the hook 36 is an elongated hook-like structure that is attached to a first end 38 of the segment of textile material and the roller 18. The hook 36 is either a molded plastic hook, a metal clip, or the like.

A return spring 28 is attached to the roller 18 and a shaft 30 that receives the roller 18. The return spring as shown is commonly referred to as a "clock spring" but may be another type of spring or a motor that exerts a biasing force on the segment of textile material 20. The shaft 30 has a first end 32 located at a first location on the roller 18 where the return spring is attached to the shaft 30. The shaft 30 has a second end 34 located at a second location on the roller 18 axially spaced from the first location.

Trim wires 40A-40C are shown in FIG. 3 that may be wires, cords, or plastic reinforcement beads. The trim wires 40A-40C are used to add flexible support for the segment of textile material 20. A single trim wire 40A can be used alone without the additional trim wires 40B and 40C.

Figure 5:
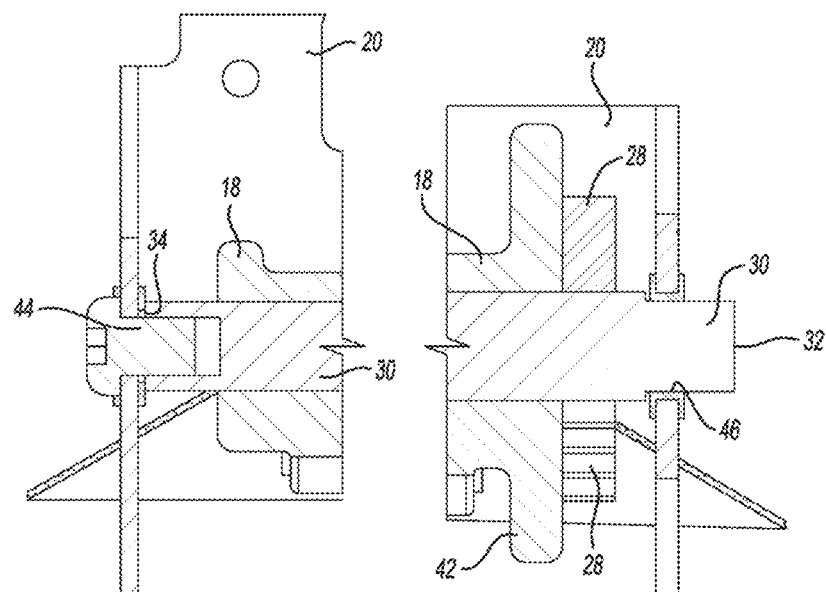
FIG. 5 is a fragmentary cross-section view taken through the axis of rotation of the roller, frame, and shaft.

Referring to FIG. 5, the first end 32 and second end 34 of the shaft 30, bracket 20, and roller 18 are illustrated. The first end 32 of the shaft 30 is received by the bracket 20. The first end of the shaft 30 is received in an opening 46 in the bracket 20. The return spring 28 is attached to the first end 32 of the shaft 30. The return spring 28 is attached to a disk 42 that is integrally formed with the roller 18 or can be assembled to the roller 18.

The second end 34 of the shaft 33 is secured to the bracket 20 with a fastener 44, such as a bolt, a screw, a pin, or the like. The first end of the shaft 30 is received in an opening 46. The shaft 30 is stationary and the roller 18 is rotatable relative to the shaft 30.

Figure 6:
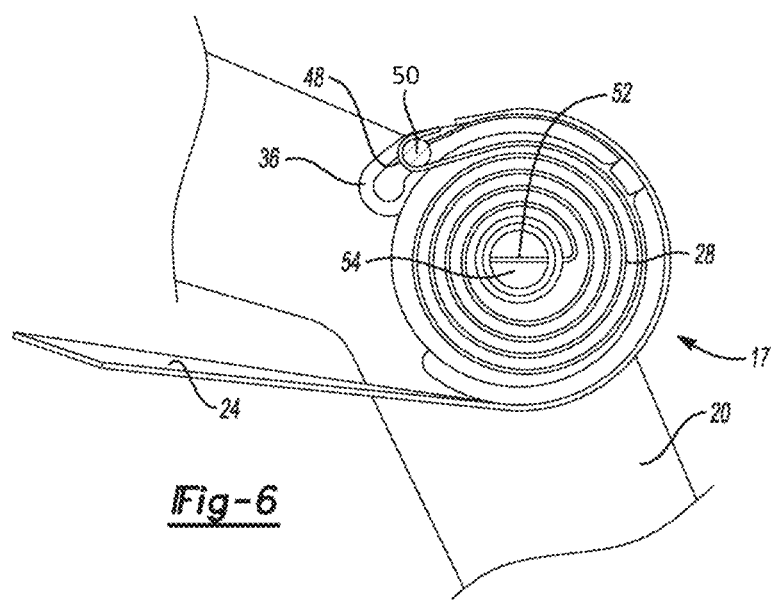
FIG. 6 is a side elevation view of a first side of the roller and the bracket with the segment of textile material wrapped around the roller in an unextended position.

Referring to FIGS. 6 and 7, the return spring 28 is connected on a first end 48 of the return spring 28 to a first spring anchor 50 provided on the disk 42 (shown in FIG. 5). The return spring 28 is connected on a second end 52 of the return spring 42 to a second spring anchor 54 and is connected to the shaft 30 (shown in FIG. 5).

Referring to FIG. 6, the tensioner 17 is shown from the first end 32 of the shaft 30 in the retracted position with the segment of textile material 24 being wrapped around the roller 18 and the extendable cushion 16 (shown in FIGS. 1 and 2) in the unextended position.

Referring to FIG. 7, the tensioner 17 is shown from the first end 32 of the shaft 30 in the extended position with the segment of textile material 24 being unwrapped from the roller 18 and the extendable cushion 16 (shown in FIGS. 1 and 2) in the extended position.

Referring to FIG. 8, the tensioner 17 is shown from the second end 34 of the shaft 30 in the retracted position with the segment of textile material 24 being wrapped around the roller 18 and the extendable cushion 16 (shown in FIGS. 1 and 2) being unextended. The fastener 44 secures the second end 34 of the shaft 30 to the bracket 20 (shown in FIGS. 1 and 2).

Referring to FIGS. 2-5, The roller 18 has a stepped structure of first portions 56 having a first radius and second portions 58 having a second radius that is less than the first radius. The first portions are provided in contact with the segment of textile material 24. The radius of the first portions is determined by the circumference of the portion of the roller 18 that corresponds to the retractable length of the segment of textile material 24. The second portion 58 a recessed relative to the segment of textile material 24 allowing for the reduction of material required to mold or otherwise manufacture the roller 18.

According to one aspect of this disclosure, an apparatus such as the seat cover tensioner assembly 17 is disclosed that comprises the segment of textile material 24 and the roller 18 attached to the segment of textile material 24. A bracket 20 assembled to a vehicle seat 10 supports a roller 18 rotatably mounted on the bracket 20. A return spring 28 is operatively connected between the roller 18 and the bracket 20 that exerts a biasing force on the roller 18 to retract the segment of textile material 24. The segment of textile material 24 is extended against the biasing force of the return spring 28 to extend the segment of textile material 24.

Other alternative and optional aspects of the above apparatus are described below.

The shaft 30 can be provided that includes the first end 32 attached at the first location on the bracket and the second end 34 attached at the second location on the bracket 20, wherein the shaft 30 supports the roller 18 to be rotatable relative to the shaft 30.

At least one trim wire 40A-40C can be attached to the segment of textile material 24 that extends substantially perpendicularly relative to the rotational axis of the roller 18.

A first trim wire 40A can be attached to the right side of the segment of textile material 24 and the right side of the roller 18, and the second trim wire 40B can be attached to the left side of the segment of textile material and the left side of the roller. A third trim wire 40C can be attached at an intermediate location on the segment of textile material 24. At least one of the trim wires 40A-40C is rolled around the roller 18 and unrolled with the segment of textile material 24.

A hook 36 can be attached to the first end 38 of the segment of textile material 24 that is connected to the roller 18 along a line that extends parallel to the rotational axis of the roller.

The apparatus can include the disk 42 attached to the roller 18, the first spring anchor 50 attached to the disk 42, and the second spring anchor 54 attached to the shaft 30, wherein the return spring 28 is wound when the segment of textile material 24 is extended and wherein the return spring 28 is unwound when the segment of textile material 24 is retracted.

The roller 18 can include portions having the first radius 56 in the area where the segment of textile material 24 contacts the roller 18 and wherein the roller 18 can include portions having the second radius 58 that is less than the first radius 56 on first and second axial ends of the roller 18.

The apparatus can be part of the vehicle seat 10 having seating surface 27, wherein the bracket 20, the roller 18, and the shaft 30 are attached to the seat 10 below the seating surface 27.

The seat 10 can include the base cushion 14 and then extendable cushion 16 that is movable toward and away from the base cushion 14. The segment of textile material 24 is extended from the roller 18 when the extendable cushion 16 is moved away from the base cushion 14, and wherein the segment of textile material 24 is retracted onto the roller 18 when the extendable cushion 16 is moved toward the base cushion 14.

The roller 18 can have the first radius 56 in the first area where the segment of textile material 24 contacts the roller 18, and wherein the roller 18 has the second radius 58 that is less than the first radius 56 in the second area that does not contact the segment of textile material 24.

The apparatus can include the fastener 44 connecting the first end 32 of the shaft 30 to the first portion of the bracket 20, and the second end 34 of the shaft 30 can be received in the opening 46 defined by the second portion of the bracket 20. The first portion of the bracket 20 and the second portion of the bracket 20 can be used to hold the shaft 30 in alignment with the rotational axis of the roller 18.

According to another aspect of this disclosure, the vehicle seat 10 is disclosed that comprises the cushion assembly having the base cushion 14 and the extendable cushion 16 that moves relative to the base cushion 14 to extend the length of the cushion assembly. The seat frame 22 supports the cushion assembly. the segment of textile material 24 encloses the cushion assembly and includes the bridging segment 26 of textile material 24 that spans the space between the base cushion 14 and the extendable cushion 16. The vehicle seat 10 includes the tensioner 17 that comprises the roller 18 that receives the segment of textile material 24, wherein the roller 18 rotates relative to the seat frame 22 about the axis of the shaft 30. The spring 28 is connected to the roller 18 and the shaft 30 that exerts the tensioning force on the segment of textile material 24 biasing the segment of textile material 24 to be rolled around the roller 18 when retracting the segment of textile material 24. The tensioning force of the spring 28 resists extending the segment of textile material 24 and holds the segment of textile material 24 in tension as the segment of textile material 24 is extended.

Other alternative and optional aspects of the above vehicle seat are described below.

The vehicle seat 10 can further comprise the shaft 30 including the first end 32 attached at the first location on seat frame 22 (or bracket 20) and the second end 34 attached at the second location on the seat frame 22 (or bracket 20) so that the shaft 30 supports the roller 18 to be rotatable relative to the shaft 30.

The vehicle seat 10 can include at least one trim wire 40A-40C attached to the segment of textile material 24 that extends substantially perpendicularly relative to the rotational axis of the roller 18.

The vehicle seat 10 can be provided with a disk 42 attached to the roller 18 with the first spring anchor 50 attached to the disk 42, and the second spring anchor 54 attached to the shaft 30. The spring 28 is wound-up when the segment of textile material 24 is extended, and the spring 28 is unwound when the segment of textile material 24 is retracted.

The roller 18 can have the first radius 56 in the area where the segment of textile material 24 contacts the roller 18 and can have the second radius 58 that is less than the first radius 56 on the roller 18.

The vehicle seat 10 can include the seat base 14 having seating surface 27, and wherein the wherein the seat frame 22, the roller 18, and the shaft 30 are attached to the seat base 14 below the seating surface 27.

The vehicle seat 10 can include the base cushion 14 and the extendable cushion 16 that is movable toward and away from the base cushion 14. The segment of textile material 24 is extended from the roller 18 when the extendable cushion 16 is moved away from the base cushion 14, and the segment of textile material 24 is retracted onto the roller 18 when the extendable cushion 16 is moved toward the base cushion 14.

The roller 18 can have the first radius 56 in the area where the segment of textile material 24 contacts the roller 18 and the second radius 58 that is less than the first radius 56 in at least one area that does not contact the segment of textile material 24.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An apparatus, comprising:
  a segment of textile material;
  a roller attached to the segment of textile material;
  a bracket attachable to a vehicle seat, wherein the roller is rotatably mounted on the bracket;
  a return spring operatively connected between the roller and the bracket that exerts a biasing force on the roller to retract the segment of textile material, wherein the segment of textile material is extended against the biasing force of the return spring to extend the segment of textile material; and
  at least one trim wire attached to the segment of textile material, such that the at least one trim wire is adapted to provide a flexible support to the segment of textile material in an extended position of the segment of textile material.

2. The apparatus of claim 1, further comprising:
  a shaft comprising a first end attached at a first location on the bracket and a second end attached at a second location on the bracket, wherein the shaft supports the roller to be rotatable relative to the shaft.

3. The apparatus of claim 1, wherein the at least one trim wire extends substantially perpendicularly relative to a rotational axis of the roller.

4. The apparatus of claim 3, wherein a first trim wire of the at least one trim wire is attached to a right side of the segment of textile material and a right side of the roller, and a second trim wire of the at least one trim wire is attached to a left side of the segment of textile material and a left side of the roller.

5. The apparatus of claim 4, wherein the at least one trim wire is rolled around the roller and unrolled with the segment of textile material.

6. The apparatus of claim 4, further comprising:
  a hook is attached to a first end of the segment of textile material, and wherein the hook is connected to the roller along a line that extends parallel to the rotational axis of the roller.

7. The apparatus of claim 1, further comprising:
  a disk attached to the roller;
  a first spring anchor attached to the disk; and
  a second spring anchor attached to a shaft, wherein the return spring is wound-up when the segment of textile material is extended and wherein the return spring is unwound when the segment of textile material is retracted.

8. The apparatus of claim 1, wherein the roller comprises a first radius in an area where the segment of textile material contacts the roller, and wherein the roller comprises a second radius that is lesser than the first radius on first and second axial ends of the roller.

9. The apparatus of claim 1, further comprising:
  a seat comprising a seating surface, and wherein the bracket, the roller, and a shaft are attached to the seat below the seating surface.

10. The apparatus of claim 9, wherein the seat comprises a base cushion and an extendable cushion that is movable toward and away from the base cushion, wherein the segment of textile material is extended from the roller when the extendable cushion is moved away from the base cushion, and wherein the segment of textile material is retracted onto the roller when the extendable cushion is moved toward the base cushion.

11. The apparatus of claim 1 wherein the roller comprises a first radius in a first area where the segment of textile material contacts the roller, and wherein the roller comprises a second radius that is lesser than the first radius in a second area that does not contact the segment of textile material.

12. The apparatus of claim 1, further comprising:
  a fastener connecting a first end of a shaft to a first portion of the bracket, and wherein a second end of the shaft is received in an opening defined by a second portion of the bracket, and wherein the first portion of the bracket and the second portion of the bracket hold the shaft in alignment with a rotational axis of the roller.

13. A vehicle seat, comprising:
a cushion assembly comprising a base cushion and an extendable cushion, wherein the extendable cushion moves relative to the base cushion to extend a length of the cushion assembly;
a seat frame supporting the cushion assembly;
a segment of textile material enclosing the cushion assembly, wherein the segment of textile material comprises a bridging segment of textile material that spans a space between the base cushion and the extendable cushion; and
a tensioner comprising:
a roller receiving the segment of textile material, wherein the roller rotates relative to the seat frame about an axis of a shaft;
a spring connected to the roller and the shaft, wherein the spring exerts a tensioning force on the segment of textile material biasing the segment of textile material to be rolled around the roller when retracting the segment of textile material, and wherein the tensioning force of the spring resists extending the segment of textile material and holds the segment of textile material in tension as the segment of textile material is extended; and
at least one trim wire attached to the segment of textile material, such that the at least one trim wire is adapted to provide a flexible support to the segment of textile material in an extended position of the segment of textile material.

14. The vehicle seat of claim 13, further comprising:
a shaft comprising a first end attached at a first location on the seat frame and a second end attached at a second location on the seat frame, wherein the shaft supports the roller to be rotatable relative to the shaft.

15. The vehicle seat of claim 14, wherein the at least one trim wire extends substantially perpendicularly relative to a rotational axis of the roller on the shaft.

16. The vehicle seat of claim 14, further comprising:
a disk attached to the roller;
a first spring anchor attached to the disk; and
a second spring anchor attached to the shaft, wherein spring is wound when the segment of textile material is extended and wherein the spring is unwound when the segment of textile material is retracted.

17. The vehicle seat of claim 13, wherein the roller comprises a first radius in an area where the segment of textile material contacts the roller, and wherein the roller comprises a second radius that is lesser than the first radius on the first axial end and the second axial end of the roller.

18. The vehicle seat of claim 13, further comprising:
a seat base comprising seating surface, and wherein the seat frame, the roller, and the shaft are attached to the seat base below the seating surface.

19. The vehicle seat of claim 18, further comprising:
a base cushion supported upon the seat frame, and an extendable cushion that is movable toward and away from the base cushion, wherein the segment of textile material is extended from the roller when the extendable cushion is moved away from the base cushion, and wherein the segment of textile material is retracted onto the roller when the extendable cushion is moved toward the base cushion.

20. The vehicle seat of claim 13, wherein the roller comprises a first radius in an area where the segment of textile material contacts the roller, and wherein the roller comprises a second radius that is lesser than the first radius in at least one area that does not contact the segment of textile material.

* * * * *